United States Patent
Okpowe et al.

(10) Patent No.: US 11,693,158 B1
(45) Date of Patent: Jul. 4, 2023

(54) GRADIENT REFRACTIVE INDEX LENSES AND METHODS OF FABRICATING THE SAME

(71) Applicants: Omena Okpowe, Miami, FL (US); Nezih Pala, Miami, FL (US); Chunlei Wang, Miami, FL (US)

(72) Inventors: Omena Okpowe, Miami, FL (US); Nezih Pala, Miami, FL (US); Chunlei Wang, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/152,937

(22) Filed: Jan. 11, 2023

Related U.S. Application Data

(62) Division of application No. 17/842,273, filed on Jun. 16, 2022.

(51) Int. Cl.
*G02B 3/00* (2006.01)
*G02B 1/04* (2006.01)
*B33Y 10/00* (2015.01)
*B28B 1/00* (2006.01)
*C03C 23/00* (2006.01)
*B33Y 40/20* (2020.01)

(52) U.S. Cl.
CPC ............ *G02B 3/0087* (2013.01); *B28B 1/001* (2013.01); *B33Y 10/00* (2014.12); *B33Y 40/20* (2020.01); *C03C 23/0095* (2013.01); *G02B 1/041* (2013.01); *G02B 2207/109* (2013.01)

(58) Field of Classification Search
CPC ............ G02B 3/0087; G02B 2207/107; G02B 2207/109; C03C 23/0095; C03C 2218/113; B29D 11/00355
See application file for complete search history.

(56) References Cited

U.S. PATENT DOCUMENTS 4,778,744 A * 10/1988 Borrelli ............... C03C 23/0095
430/290
9,903,984 B1    2/2018 Williams

FOREIGN PATENT DOCUMENTS

CN    112987143    6/2021

* cited by examiner

*Primary Examiner* — Alex A Rolland
(74) *Attorney, Agent, or Firm* — Saliwanchik, Lloyd & Eisenschenk

(57) ABSTRACT

Gradient refractive index lenses (GRI-Ls) and methods of fabricating the same are provided. GRI-Ls can be fabricated by stereolithography (SLA) and/or photo-assisted, thermal-assisted, and/or other laser-based curing from at least two precursors with a preset refractive index gradation along the planar axis. These lenses are self-focusing lenses and may be convergent or divergent for decreasing and increasing refractive indices from the center, respectively. Rather than a gradation in lens thickness from the center, the GRI-Ls can have a gradation of composition from the center.

20 Claims, 10 Drawing Sheets

| | p(HEMA) | B-SiO$_2$ | TiO$_2$ |
|---|---|---|---|
| $n_o$ | 1.514 | 1.47 | 2.76 |
| GRI-L Power law distribution (so-called Luneburg) (L1) | $n(r) = \frac{1}{f}\sqrt{1 + f^2 - \left(\frac{r}{R}\right)^2}$ | | |
| GRI-L Quadratic distribution (so-called selfoc) (S1) | $n(r) = n_o\left(1 - \frac{g_o^2}{2}r^2\right)$ | | |
| GRI-L hyperbolic distribution (H1) | $n(r) = n_o(\sec h(gr))$ | | |

FIG. 8

| Parameters | |
|---|---|
| Incident wavelength | 589.29 nm |
| Print resolution | 200 μm |
| Print layer thickness/no of planes | 80 μm |
| Primary sludge refractive index | 1.47 |
| Incident wave intensity | 100 W/m² |

FIG. 9

| GRI-L Distribution | sample name | lens diameter(2R)(m) | GRI-L parameter(m) | peripheral ray span(m) | n(0) | n(R) | Δn | inter ray spacing | h(cm) | Δn/Δx(m⁻¹) |
|---|---|---|---|---|---|---|---|---|---|---|
| Luneberg | L1a | 0.080 | 0.942 | 0.076 | 1.470 | 1.000 | 0.470 | 0.002 | 4.0 - 10 | 2.938 |
| Selfoc | S1a | 0.060 | 41.240 | 0.046 | 1.470 | 0.350 | 1.120 | 0.002 | 0.5 - 3.5 | 9.333 |
| Selfoc | S1b | 0.060 | 41.239 | 0.040 | 1.470 | 0.350 | 1.120 | 0.002 | 2.0 | 9.333 |
| Hyperbolic | H1a | 0.083 | 41.480 | 0.032 | 1.470 | 0.513 | 0.957 | 0.002 | 2.0 - 3.0 | 5.791 |
| Hyperbolic | H1b | 0.083 | 31.490 | 0.032 | 1.470 | 0.746 | 0.724 | 0.002 | 2.0 - 3.0 | 4.383 |
| Hyperbolic | H1c | 0.083 | 20.370 | 0.032 | 1.470 | 1.069 | 0.401 | 0.002 | 2.0 - 3.0 | 2.428 |
| Selfoc | S1c | 0.006 | 41.239 | 0.004 | 1.470 | 1.459 | 0.011 | 0.0004 | 0.2-1; 2-10 | 0.938 |

Simulation conditions for GRI-L optical property evaluation

FIG. 10

GRADIENT REFRACTIVE INDEX LENSES AND METHODS OF FABRICATING THE SAME

CROSS-REFERENCE TO RELATED APPLICATION

The present application is a divisional application of U.S. application Ser. No. 17/842,273, filed Jun. 16, 2022, the disclosure of which is hereby incorporated by reference in its entirety, including all figures, tables, and drawings.

BACKGROUND

Transparent lenses are used in various applications where the modification of light, sound, or electronic waves are of paramount importance. Hydrogel-based, silicone, silica, and poly (methyl methacrylate) (PMMA)-based glasses have all been utilized for fabricating various lens types depending on the specific properties required for varying applications. These properties include oxygen permeability, cost of manufacturing, ease of manufacturing, transparency, biocompatibility, density, mechanical properties (e.g., stiffness, toughness, and elastic modulus), hydrophobicity, biocompatibility, and others. Gradient refractive index lenses (GRI-Ls) have optical properties generated from a preset gradation of refractive index in a material. Properties of cylindrical GRI-Ls may either exhibit axial or radial trends. An advantage of GRI-Ls over normal spherical lenses are that GRI-Ls with planar surfaces make mounting in systems with other optical components much easier. In addition, spherical aberrations typical of spherical lenses are reduced and tunable in GRI-Ls depending on the precision of the fabrication technique utilized. GRI-Ls are applicable in micro-optical telescopes, solid state lasers, fiber collimators, optical data storage, ophthalmology (high power contact lenses), and other fields.

BRIEF SUMMARY

Embodiments of the subject invention provide novel and advantageous gradient refractive index lenses (GRI-Ls), as well as fabrication methods thereof. GRI-Ls can be fabricated by stereolithography (SLA) and/or photo-assisted, thermal-assisted, and/or other laser-based curing from at least two precursors with a preset refractive index gradation along the planar axis, such as a blend of two ceramic precursors or one or more hybrid polymers. These lenses are so called self-focusing lenses and may be convergent or divergent for decreasing and increasing refractive indices from the center, respectively. Rather than a gradation in lens thickness from the center, the GRI-Ls can have a gradation of composition from the center. Modifications can be made to conventional SLA additive manufacturing technologies (e.g., vat photopolymerization, digital light processing, and/or gel casting) result in GRI-L lenses (e.g., ceramic GRI-Ls) for various applications.

In an embodiment, a GRI-L can comprise: a first material; and a second material different from the first material, where a refractive index of the first material is different from a refractive index of the second material, and where the GRI-L has a gradation of composition between the first material and the second material, from a center of the GRI-L to an edge of the GRI-L, such that the GRI-L has a gradation in refractive index from the center of the GRI-L to the edge of the GRI-L. The GRI-L can be planar. A thickness of the GRI-L can be constant from the center of the GRI-L to the edge of the GRI-L. The first material can be a ceramic material and/or the second material can be a ceramic material. The first material can be $SiO_2$ or $TiO_2$ and/or the second material can be $SiO_2$ or $TiO_2$. For example, the first material can be $SiO_2$ and the second material can be $TiO_2$. The GRI-L can have a thickness in a range of, for example, from 1 millimeter (mm) to 12 centimeters (cm) (e.g., from 0.5 cm to 12 cm or from 1 mm to 12 mm), though embodiments are not limited thereto.

In another embodiment, a method of fabricating a GRI-L can comprise: preparing a sol gel precursor comprising a first material; preparing a resin sludge comprising a second material and a polymer material, the second material being different from the first material, and a refractive index of the first material being different from a refractive index of the second material; performing a three-dimensional (3D) printing process in a vat platform using the resin sludge to give a green body; performing a calcination process on the green body at a first temperature high enough to eliminate the polymer material, to give a calcinated body; flooding the sol gel precursor into the vat platform with the calcinated body to give an intermediate lens body, the flooding of the sol gel being performed in such a manner so as to allow for control of concentration of the sol gel precursor along a vertical axis of the intermediate lens body and a horizontal axis of the intermediate lens body; and performing a densification step on the intermediate lens body at a second temperature to give the GRI-L. The GRI-L can be planar. A thickness of the GRI-L can be constant from the center of the GRI-L to the edge of the GRI-L. The first material can be a ceramic material (e.g., $SiO_2$ or $TiO_2$), and the second temperature can be below a softening temperature of silica (and/or ceramic). The second material can be a ceramic material (e.g., $SiO_2$ or $TiO_2$), and the first temperature can be below the softening temperature of silica (and/or ceramic). For example, the first material can be $SiO_2$ and the second material can be $TiO_2$, with the first and second temperatures both being below the softening temperature of silica (and/or ceramic). The method can further comprise adding (e.g., to the sol gel precursor, the resin sludge, the green body, the calcinated body, and/or the intermediate lens body) a dopant (e.g., titanium), before and/or after performing the calcination process. The method can further comprise thickening the resin sludge (e.g., microparticles and/or nanoparticles, such as fumed silica microparticles and/or nanoparticles), such as before performing the 3D printing process using the resin sludge. The GRI-L can have a thickness in a range of, for example, from 1 mm to 12 cm (e.g., from 0.5 cm to 12 cm or from 1 mm to 12 mm), though embodiments are not limited thereto.

BRIEF DESCRIPTION OF DRAWINGS

FIG. 8 shows a table of synthesis parameters for simulated 3D-printed B—SiO$_2$ glass samples.

FIG. 9 shows a table of incident ray, print, and other parameters.

FIG. 10 shows a table of simulation conditions for GRI-L optical property evaluation.

DETAILED DESCRIPTION

Figure 1:
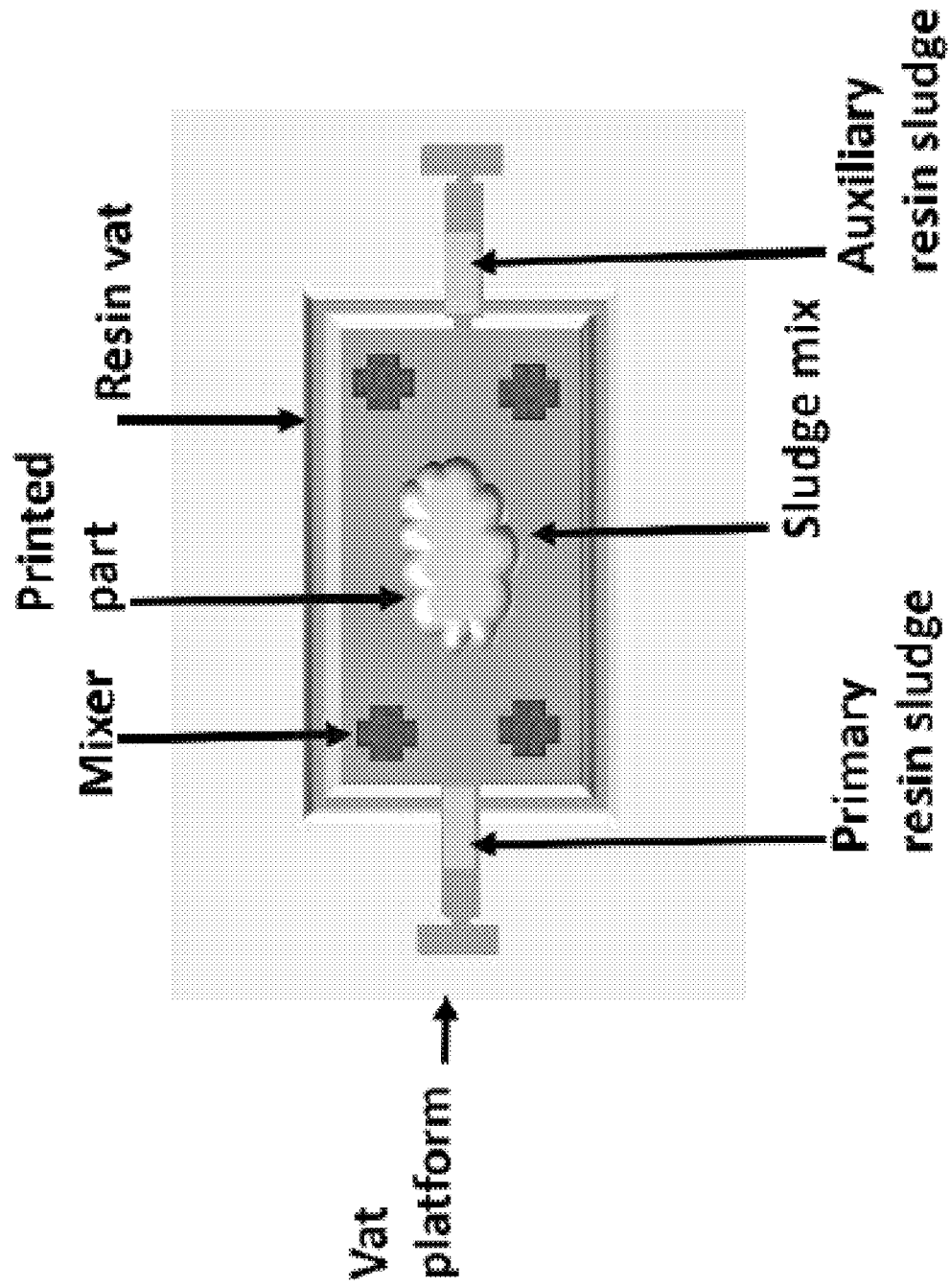
FIG. 1 shows a top view of a vat setup for three-dimensional (3D) printing of gradient refractive index lenses (GRI-Ls), according to an embodiment of the subject invention.

Embodiments of the subject invention provide novel and advantageous gradient refractive index lenses (GRI-Ls), as well as fabrication methods thereof. GRI-Ls can be fabricated by stereolithography (SLA) and/or photo-assisted, thermal-assisted, and/or other laser-based curing from at least two precursors with a preset refractive index gradation along the planar axis, such as a blend of two ceramic precursors or one or more hybrid polymers. These lenses are so called self-focusing lenses and may be convergent or divergent for decreasing and increasing refractive indices from the center, respectively. Rather than a gradation in lens thickness from the center, the GRI-Ls can have a gradation of composition from the center. Modifications can be made to conventional SLA additive manufacturing technologies (e.g., vat photopolymerization, digital light processing, and/or gel casting) result in GRI-L lenses (e.g., ceramic GRI-Ls) for various applications.

The SLA process for amorphous glass ceramics is preferable to conventional melt quenching and the use of molds as it entails a room temperature fabrication process supported by a relatively lower temperature densification. In addition, there is no dependence on harsh chemicals for miniaturized features. It is also preferable to the Direct Ink writing in particular as it is relatively a faster process.

GRI-L lenses belong to the family of functional graded materials, which exhibit a gradation in properties. In this case, the lenses exhibit a gradation in the refractive index along any of its dimensions.

Embodiments of the subject invention provide GRI-Ls (e.g., planar GRI-Ls) with preset gradation, which can be fabricated via SLA and which have properties comparable to commercially available standards. By controlling the dopants at several stages of the fabrication process, the properties of the final product can be tuned along the cross section as well as along the vertical axis. For example, the optical properties of the lens, the mechanical properties of metallic glasses, silicon dopant concentration for electronic applications, and other parameters can be programmed by using this technique.

In an embodiment, an SLA process can comprise a photocure calcination and a densification process (see also, e.g., Horowitz et al., Towards a more accurate refractive index profile of ion-exchanged waveguides, Thin Solid Films, 460, 206-210, 2004, doi.org/10.1016/j.tsf.2004.01.049; which is hereby incorporated herein by reference in its entirety. First, a liquid composite sludge comprising a photocurable pre-polymer resin mix and a second precursor (e.g., a ceramic precursor) as filler with the right viscosity and optical properties can be systematically three-dimensional (3D) printed on a layer-by-layer basis into desired ensembles. These ensembles can then be subjected to an optimizable thermal calcination process (e.g., in air, such as ambient air) before being densified at a predetermined (an appropriate) rate, time, temperature, and other environmental conditions. One or more dopants can be introduced during the fabrication, either before or after calcination.

As a practical example, transparent glass GRI-Ls based on silicate glass networks doped with titanium dopants have been fabricated to demonstrate the fabrication method due to their relatively low cost and high refractive index of $TiO_2$ (see Example 2). The fabrication method can emphasize the gradation of properties dependent strictly on the material composition changes within the structure. The easily simulation-controllable 3D printing helps to ensure lenses with precise gradient refractive index profiles and optical properties. The methodology can also lead to scale ups, microscopic features, and miniaturization, as well as applications where polymer lenses could be inapplicable (e.g., under harsh environmental and/or high temperature applications). This technique can also be extended to other non-optical functionally graded materials requiring gradients of refractive index.

In an embodiment, a sol gel precursor can be provided or synthesized. A resin sludge can be provided or prepared and optionally thickened (e.g., by fumed silica nanoparticles) and applied for 3D printing (e.g., in a standard Formlabs 3D stereolithography printer). The printed composites can be subjected to a calcination process to eliminate the polymeric component at temperature steps below the softening temperature of the silicate component but sufficient enough to eliminate all volatiles and polymerics. This leaves a porous material, and this resultant porous silicate ceramic can then be placed under a diaphragm-like device (see FIG. 1) that allows for the control of the aperture. The sol gel precursor can then be flooded through the controllable aperture to allow for adequate time for precise concentration along the vertical axis and the horizontal axis. A densification step can then be carried out at temperatures below the softening of silica.

In another embodiment, a laboratory designed laser printer system that allows for modulated mixing while simultaneously printing can be used. First, two separate sol gel precursors (e.g., two separate silica and $TiO_2$ based sol gel precursors) can be provided or synthesized. Proportions of fumed silica, and a third sol gel (e.g., $SiO_2$ sol gel) can be added to a first resin system, and proportions of the third sol gel (e.g., $SiO_2$ sol gel), fumed silica, and the first sol gel (e.g., $TiO_2$ sol gel) mixed and dispersed in a polymer-based resin mixture (e.g., HEMA-based acrylate resin mixture) can be added in a second resin system, yielding two separate liquid composites with different optical transmittance properties. The pure silica liquid composite can be placed in the resin vat while the composite (e.g., $TiO_2$-silica liquid composite) can be systematically introduced into the vat followed by mixing during the printing process. After printing, the resultant green body can be calcined at temperatures above the polymer degradation but below the melting of the silica while keeping temperature ramp rates super slow to prevent or inhibit pulverization of the calcined body. This can be followed by a thermal densification process (e.g., in vacuum).

GRI-Ls can be fabricated from utilizing a mixture of a photocurable resin sludges by an SLA technique. Simulations based on the adoption of the precursor and resin properties show measurable and tunable optical properties such as spherical aberrations (see Example 1). The spherical aberrations on the lenses vary proportionally with both thicknesses and GRI-L parameters irrespective of the type of profile considered, and it is easy to optimize for zero aberration lenses. Experimental results show that the fabrication methods work in practice (see Example 2). Resin sol gel systems are miscible, and GRI-L profiles can be determined after fabrication.

Related art fabrication methods for lenses includes spin casting, molding, and lathe cutting. In order to generate gradient refractive indices on substrates, several approaches have been utilized. For polymeric lenses, photocurable systems such as ultraviolet (UV) lasers can be used, where photosensitive monomeric systems are either partially polymerized or partially cross-linked so that the refractive index changes as a function of the degree of polymerization or crosslinking at different radial distances. For ceramic GRI-Ls, selective charged particle substitution and implantation can be used, where ion deficit substrates are immersed in an ion rich liquid to allow for diffusion into the matrix or for a replacement. Ion reorganization (e.g., the application of an electric field close to the glass transition temperature induces migration of ions in the lens material, chemical vapor deposition (e.g., two or more materials are selectively deposited onto a substrate), and generation of dopant profile by nucleon irradiation can also be used to generate refractive index profiles. Controlled vitrification can be done by subjecting a preformed material selectively to thermal energy sources even though this may lead to a slight degree of scattering from the crystallites/crystals present. These techniques have not been shown to be promising towards scale-ups or for on-chip applications. There are limited commercially available GRI-Ls in the related art, and they have a narrow range of material choices.

Embodiments of the subject invention can use stereolithography (SLA) to generate a refractive index gradient profile to fabricate GRI-Ls. SLA can be used as an additive manufacturing technique for fabricating GRI-Ls. Knowledge about sol-gel synthesis for ceramic materials can be combined with advancements in stereolithographic techniques. Though fabrication using ceramic ($SiO_2$—$TiO_2$), HEMA-$TiO_2$, and B—$SiO_2$ materials is discussed in detail herein, this for exemplary purposes only and should not be construed as limiting. Embodiments of the subject invention can include lenses (and/or fabrication thereof) using any suitable (for SLA) material known in the art of lenses. Unlike related art methods for GRI-L fabrication, embodiments of the subject invention allow for better resolution of structures, while being cheap, less complex, fast, easy to carry out, able to be extended to ceramic glass lenses, and capable of producing a precise distribution of the refractive index. Embodiments also allow for integration of GRI-Ls into on-chip applications. Modeling and simulation has been used to verify the SLA techniques and determine some resulting optical properties in the GRI-Ls (see, e.g., Example 1).

The SLA process for ceramics can be used for products exhibiting a high degree of porosity values after calcination unlike other conventional ceramic fabrication processes where the product porosities are much lower (about 50% less). This higher porosity is due to the need to make the resin sludges flowable and compatible with the SLA process during printing. Hence, there is a tradeoff between these, which should be accounted for during the densification process where shrinkage takes place. In an ideal case, the final densified glass is proportional to the initial ceramic composition in the sludge and thus this is accounted for during the simulation procedure for printing in terms of the number of slices.

In practice, the inhomogeneity of ceramic particles such as borosilicates will act as a hindrance towards effective sintering as there is a complicated mix of microparticles and nanoparticles in the sludge with different surface energies and diffusion rates during the densification process. The nanoparticles form amalgams or attach to the microparticles, while the microparticles require much more energy for diffusion. However, the use of homogenous nanoparticles and sol-gel precursors in embodiments of the subject invention helps to eliminate this densification challenge, thus resulting in a more efficient densification process. The simulation in Example 1 accounts for the expected porosity by accommodating shrinkage in the printed body by utilizing an appropriate number of slices, though it ignores the non-idealness of the densification process preferring to work with a simplified process partly because it is based on the sol-gel precursors, which result in a homogenous network. Combinations of isothermal and non-isothermal temperature and time treatments for densification of non-homogenous systems can be considered or used to allow for more agreement of simulated and experimental data.

Another factor that could affect the closeness of the results in Example 1 to the ideal is that simplified ray optics were used in Example 1 and these depend on Gaussian approximations and simple ray tracing and do not handle light as an electromagnetic wave, which it actually is, so that effects of diffraction for instance are neglected. Wave optics or more encompassing simulation procedures could be used instead to give better simulation results.

GRI-Ls for practical applications require preset distributions and the need to properly simulate these distributions to accurately predict the fabrication conditions is of paramount importance. In addition, from a technological stance, prior utilization of simulations before 3D printing results in saving time, cost, energy, and other resources for fabricating quality GRI-Ls. Embodiments of the subject invention adapt SLA techniques for fabrication of GRI-Ls. Results from the simulation (see Example 1) show several degrees of freedom and flexibility for the manufacture of GRI-Ls based on both composition and design. Experimental results show the compatibility of ceramic sol-gel precursors and SLA hydroxyethyl methacrylate resins for photocurable sludge preparations (see Example 2). Embodiments of the subject invention can replace conventional fabrication of GRI-Ls, as well as improve the additive manufacturing process.

Embodiments of the subject invention allow for fabrication of glass and ceramic structures with custom-designed geometries. The lenses can have planar, spherical, and other shapes as desired. Fabrication can be performed at-site and/or on-demand. The fabrication methods of embodiments of the subject invention allow for scalability and for large volume manufacturing, and are relatively simple, low-cost, low-labor, low energy, and environmentally benign. The fabrication methods can be: free of contamination that may otherwise result from molds and crucibles in conventional manufacturing techniques; allow for programmable and precise control of optical and potentially electrical, mechanical, and other material properties with high special resolution; and allow for digital and distributive manufacturing. The fabrication methods are low-temperature processes compared to typical melt quenching and lathe cutting processes and do not require the typical finishing processes associated with melt quenched samples (e.g., grinding and polishing). That is, GRI-Ls can be fabricated while excluding any grinding step and/or any polishing step.

Embodiments of the subject invention allow 3D printing of custom-designed functional glass and ceramic materials with precisely controlled gradation in optical, electrical, mechanical, and material properties with high spatial resolution when dopants are introduced. This capability allows fast, on-site manufacturing of various components and integrated systems including eyeglass lenses, advanced filters and light detectors, lab-on-chip systems, and other compound and complex lens systems.

Fabrication methods of embodiments of the subject invention are relatively simple and inexpensive, with low labor and low energy requirements, and with relatively low processing temperature compared to typical melt quenching processes. The fabrication methods do not have the contamination and additional cost of cast molds and crucibles. Ceramic GRI-Ls also provide advantages over polymer lenses as they are more durable for harsh and high temperature applications while also possessing better mechanical properties. GRI-Ls of embodiments of the subject invention can be used for, e.g., consumer glass (lenses), monitoring and detection, solid state laser systems, fiber collimators, optical data storage systems, healthcare, and homeland security and defense.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

A simulation was carried out using COMSOL version 5.5 version based on Electromagnetic Ray Optic Modules. Incident plane polarized waves of wavelength 589.29 nanometers (nm) with intensity 100 Watts per meter squared (W/m$^2$) were used. Three GRI-L systems (L1, S1, H1) with refractive index exhibiting a rotational symmetry about the z axis with parabolic transverse profiles according to the expressions in the table in FIG. 8 were utilized, where n(r) is the refractive index at a location r from the origin, no is the refractive index at the origin and, and R is the radius of the lens. The parameters A (=$g_o^2$); g, and f (sometimes called focal parameter) are all measures of the GRI-L parameter. Because the simulation was based on a ceramic lens case study, it was programmed to accommodate a 60% shrinkage consistent with the post-printing processes (calcination and densification) of the pHEMA-B—SiO$_2$ printed structures. The table in FIG. 9 shows incident ray, print, and other parameters used in the simulation, and the table in FIG. 10 shows the simulation conditions for the GRI-L property evaluation.

Miscible ceramics and polymeric material systems were used in such a way that a refractive index distribution from one extreme to the other was obtained. For the composite case, acrylate monomers were used, as well as sol-gel precursors. As a test case, hydroxyethyl methacrylate (HEMA) with a refractive index of 1.514 was used as the acrylate component with a TiO$_2$ wet gel precursor system. For the ceramic lens case, a wet gel borosilicate (B—SiO$_2$) (n=1.47) mix obtained via the Stober process coupled with a similar solution doped with TiO$_2$ precursor further combined with a photocurable HEMA resin mix in a 40:60 ratio was utilized. The refractive index of both the pHEMA-TiO$_2$ and the SiO$_2$—TiO$_2$ sludges vary according to Equation 1.

$$n_s^2 = \Sigma v_i n_i^2 \quad (1)$$

where $n_s$ is the refractive index of the sludge, $v_i$ is the composition of each sludge component, and $n_i$ is the refractive index of each sludge component.

A laboratory-made printer was used that allows for a simultaneous print, hold, and mix process. FIG. 1 shows a top view of the resin vat set-up used. A stirrer within the resin tank was controlled at a selected speed to allow for introduction of a mixture component and simultaneous mixing. The times between laser motion can be programmed to accommodate an alternate introduction and mixing of both components based on Equation (2).

$$t_m = K\left(\frac{V_L}{N_i}\right)^{\frac{1}{3}} \quad (2)$$

where $t_m$ is the mixing time, $V_L$ is the liquid volume, $N_i$ is the stirrer speed, and K is an experimentally determinable constant.

The time varies directly and inversely with the volume and stirrer speed, respectively. The estimated amount of the secondary liquid constituent can be estimated from Equation 3:

$$n(r) = v_1 n_1 + (1-v_1)n_2 \quad \Delta r < 0.2$$

$$n(r)^2 = v_1 n_1^2 + (1-v_1)n_2^2 \quad \Delta r > 0.2 \quad (3)$$

where n(r) is the refractive index of the resultant mix, v is the fractional content, and $n_1$ and $n_2$ are the refractive indices of the individual constituent liquids 1 and 2, respectively.

The lenses were fabricated by first mixing two resin systems systematically. A first resin system was prepared from an acrylate-based pre-polymer resin-mix comprising HEMA (Sigma Aldrich Inc.), trimethylolpropane ethoxylate triacrylate (Sigma Aldrich Inc.), and 0.5 wt % of phenylbis (2,4,6-trimethylbenzoyl) phosphine oxide (Sigma Aldrich Inc.) in a ratio of 100:50:7. The second was prepared by adding a TiO$_2$ gel to the first resin system and mixing thoroughly with a hotplate and magnetic stirrer in the dark for 24 hours. The gel:resin ratio was 1:4 by weight. The TiO$_2$ gel was formed by aging a TiO$_2$ sol-gel precursor synthesized from titanium isopropoxide. A mixture of 1 ml of isopropanol and 1 ml of water was added drop by drop to 2 ml of titanium isopropoxide and left stirring for one hour at 80° C. A nitric acid solution of 0.08 ml HNO$_3$ acid and 0.8 ml of deionized water was further added into the mixture drop by drop while stirring at 80° C. for 6 hours. The prepared sludges were then degassed under vacuum before the photocuring process. A scanning electron microscope (SEM), FS100 FEG emission SEM-EDS (Tokyo, Japan), was utilized to investigate the morphology of the resulting lens. Energy dispersive X-ray spectroscopy (EDS) was used to ascertain the elemental composition of the resulting products as well as establish the dopant profile. The light transmittance and absorption at different wavelengths of the final densified body were investigated using a Solar Cell Spectral response measurement system (PV measurements, Inc (Model QEX10)) in transmittance mode.

Figures 2A, 2B:
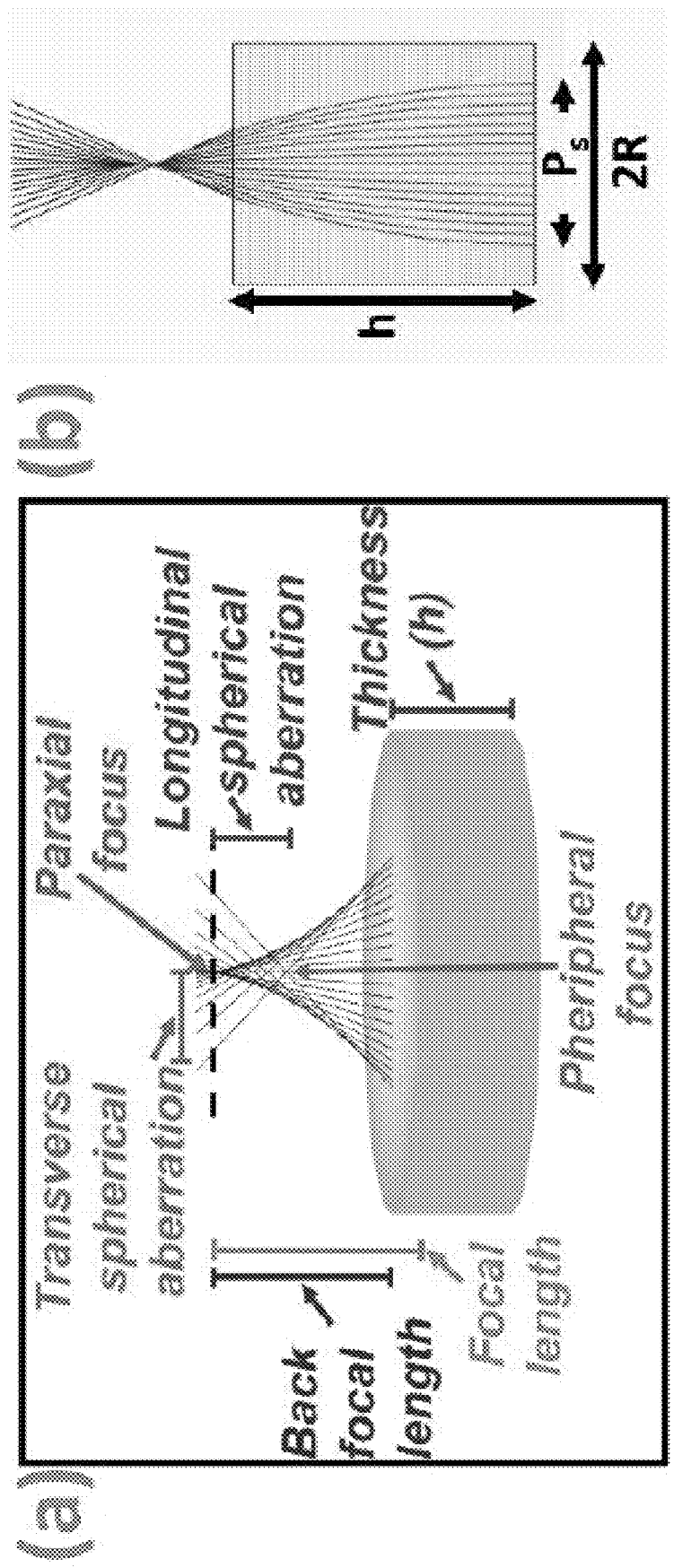
FIG. 2(a) shows a schematic view of resulting ray properties when an initial parallel beam of an arbitrary peripheral ray span is focused on a planar GRI-L of thickness h.
FIG. 2(b) shows a schematic view of a GRI-L showing the peripheral ray span and lens dimensions.

FIG. 2(a) shows a schematic illustration of the optical characteristics of emergent rays from an arbitrary GRI-L. The optical axis of the GRI-L is an imaginary straight line through its geometrical center, which joins the two centers of curvature of the lens surfaces. Rays along or closest to the optical axis making only a minute angle with it are paraxial rays, whereas those farther away are the marginal or peripheral rays. The focal length and back-focal length of Luneburg lenses are designed to be unity whereas those for hyperbolic and parabolic GRI-Ls in the table in FIG. 8 are given by Equation 4.

$$f = \frac{1}{n_0 g \sin(gh)} \quad (4)$$

$$bfl = \frac{1}{n_0 g \tan(gh)}$$

where f is the focal length, bfl is back-focal length, g is a measure of the GRI-L parameter, and no is the refractive index at the lens center. Spherical aberrations occur when varying wavelengths are focused at different points on the focal plane. For example, in convex lens systems, they may be positive when the peripheral rays are closer to the lens surface than the paraxial rays or negative when the peripheral rays are focused farther away from the lens surface than the paraxial ones. The longitudinal spherical aberration corresponds to the interspace along the optical axis over which the image is focused, whereas the interspace between the outermost ray and the optical axis at the paraxial focus is the transverse spherical aberration. FIG. 2(b) shows a schematic of the rays as well as the lens dimensions. The distance between the farthest incident peripheral rays is the peripheral ray span ($P_s$).

Figures 3A, 3B:
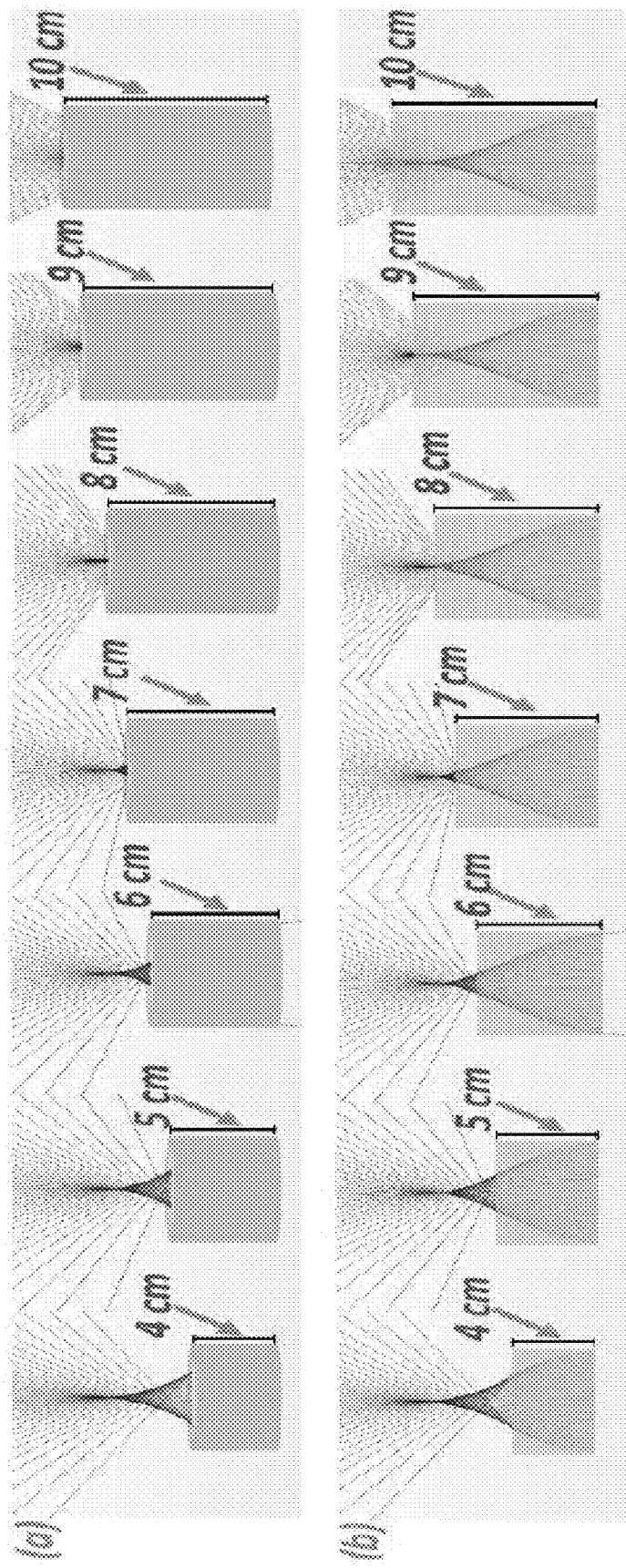
FIG. 3(a) shows optical ray behavior for Luneburg power-law profiled borosilicate (B—$SiO_2$) ceramic GRI-Ls of varying lens thicknesses.
FIG. 3(b) shows orthographic projection view of Luneburg power-law profiled B—$SiO_2$ ceramic GRI-Ls, showing the ray propagation behavior within the lens structure, for varying lens thicknesses.

FIG. 3(a) shows that the optical ray behavior of the ray trajectories obtained for the printed lenses exhibiting Luneburg behavior (L1) have a refractive index varying according to the power law equation in the table in FIG. 8. The GRI-L constant (focal parameter) is a function of the initial refractive index at the center of the lens. The refractive index decreases to unity at a unique preset diameter; however, smaller dimensions may be utilized as well. By taking the refractive indices of both materials at wavelength of 589.29 nm to be that of the lens at its origin, the focal parameter and the radius of the lens corresponding to the desired characteristic GRI-L profile ($\delta_n/\delta_x$) is fixed. The lens thicknesses were varied from 4 centimeters (cm) to 10 cm. The focal length expectedly reduced with increasing lens thickness until beyond 7 cm thickness where it domiciled within the lens structure. The cross-sectional views of both lenses indicate the gradual decrease of the refractive index from the center towards the lens circumference. FIG. 3(b) shows the orthographic projection view of the Luneburg GRI-Ls at specified lens thicknesses. This allows for evidence of the ray propagation behavior within the lens structure in addition to the location of the focal lengths. In addition to the power law profile, GRI-Ls with their refractive indices exhibiting a parabolic profile according to quadratic (S1) and hyperbolic functions (H1) shown in the table in FIG. 8 were also utilized.

Figures 4A, 4B:
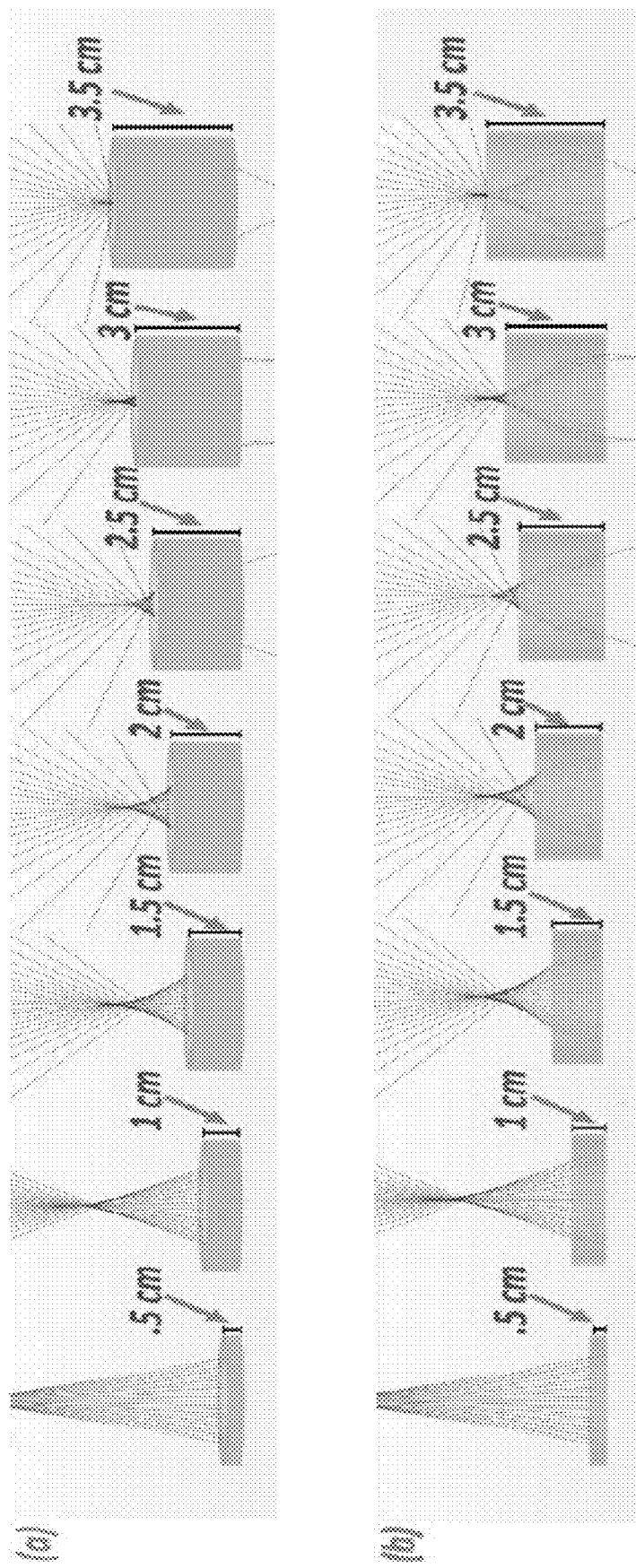
FIG. 4(a) shows optical ray behavior for self-focusing quadratic profiled B—SiO$_2$ ceramic lenses (focal parameter=1700.68 per square meter (m$^{-2}$)) for varying lens thicknesses.
FIG. 4(b) shows orthographic projection views for self-focusing quadratic profiled B—SiO$_2$ ceramic lenses, showing the ray propagation behavior within the lens structure, for varying lens thicknesses.

FIG. 4(a) shows the observed emergent rays for a lens GRI-L profile based on quadratic (S1) profile for the B—SiO₂. The focal lengths were observed to reduce as the lens thickness increased. There is a lens thickness threshold beyond which the focal length becomes negative and the rays begin to diverge getting reflected back into the lens structure as observed in FIG. 4(b) beyond the 2 cm thick lenses. A comparison between the series of FIGS. 3(a and b) and 4 (a and b) shows that the emergent ray behavior depends on GRI-L profile utilized for simulation, as will be the case in reality.

Figures 5A, 5B:
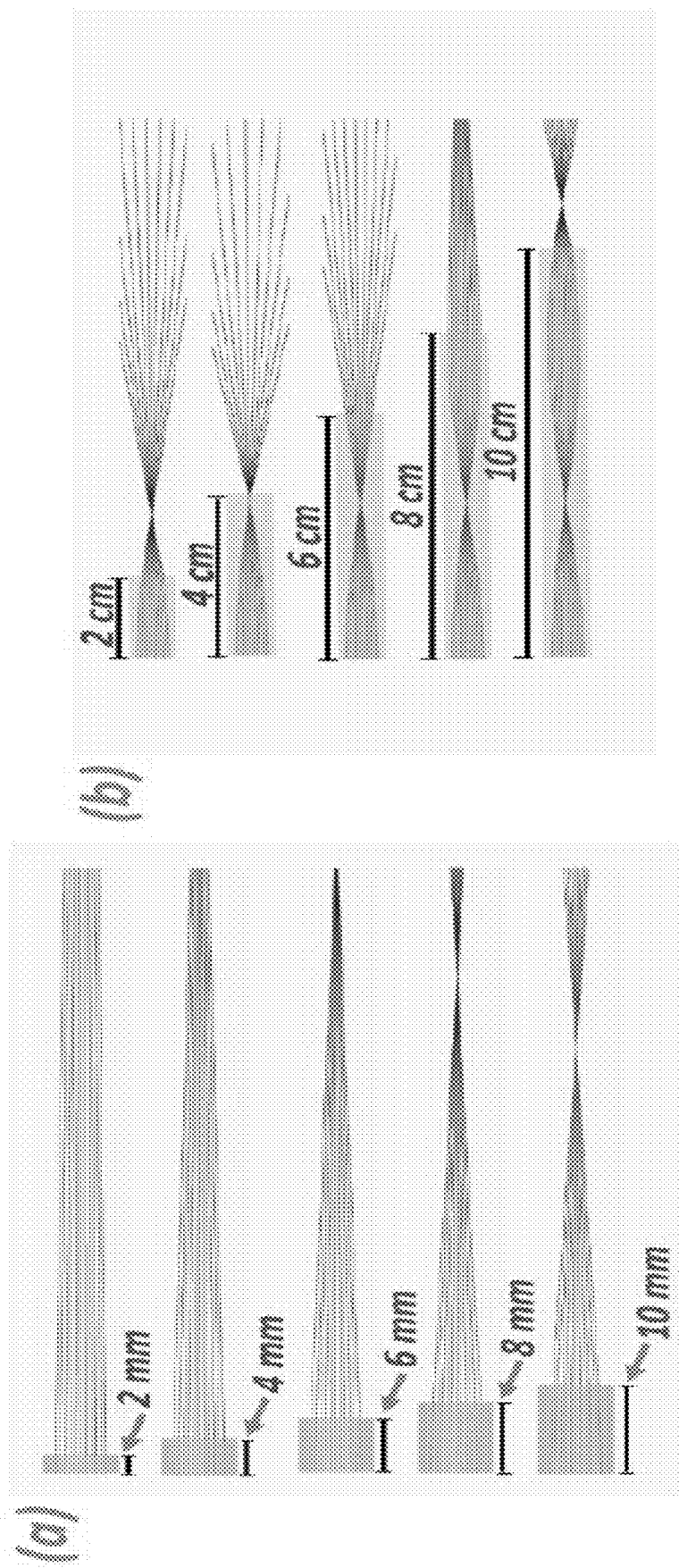
FIG. 5(a) shows optical ray trajectories for printed B—SiO$_2$ lenses with profiles varying parabolically (GRI-L parameter=41.24), for varying lens thicknesses.
FIG. 5(b) shows optical ray trajectories for printed B—SiO$_2$ lenses with profiles varying parabolically (GRI-L parameter=41.24), for varying lens thicknesses (of lens rods).

FIGS. 5(a) and 5(b) show the simulation for the optical behavior of the ray trajectories for printed B—SiO₂ ceramic lenses exhibiting the so-called selfoc-lens behavior according to the table in FIG. 8. Lenses shown are for heights varying between 200 micrometers (µm) and 10 millimeters (mm). For a B—SiO₂ lens system where n=1.47, for a 0.02 change in refractive index in a 4 cm radius lens, the GRI-L parameter can be estimated (A=1700.68 per meter squared (m⁻²). A lens of radius 4 cm was used. Equation 5 gives an expression to determine the number of simulation planes (slices) ($n_s$) utilized for the simulation process for a given lens of thickness h.

$$S_n = \frac{h}{z_{res} f_c} \quad (5)$$

where $z_{res}$ and $f_c$ are respectively the z-resolution of the SLA printing system and the fractional content of the B—SiO₂ particles by volume in the resin sludge before printing. In this example, the z-resolution used was that of the 3D printer (200 µm), which is equivalent to 12500 slices per meter (slices/m) according to Equation 5.

Figures 6A, 6B, 6C, 6D:
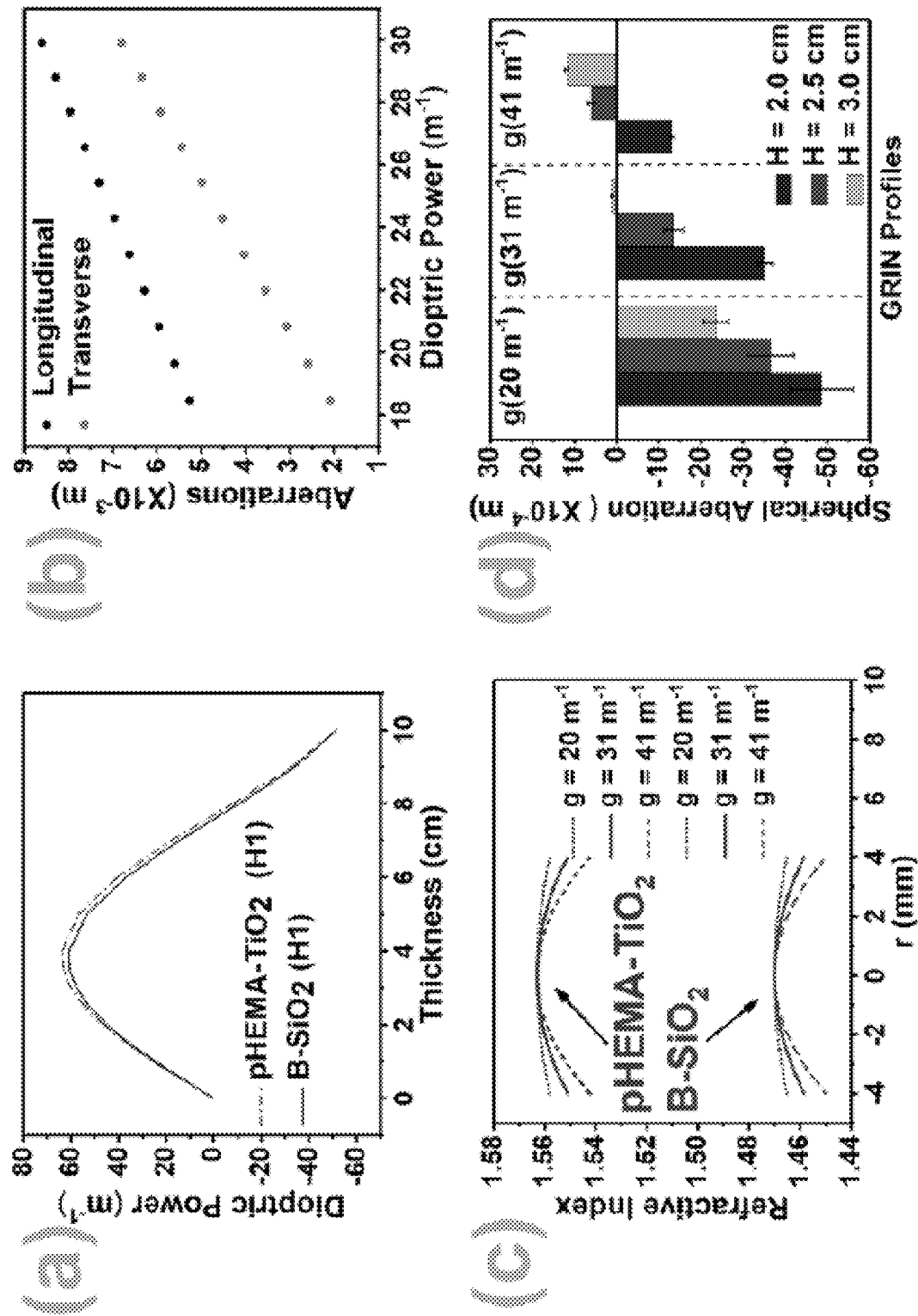
FIG. 6(a) shows a plot of dioptric power (in per meter (m$^{-1}$)) versus thickness (in centimeters (cm)), showing variation of dioptric power with increasing thickness of poly (hydroxyethyl methacrylate) (pHEMA)-Titania (TiO$_2$) and B—SiO$_2$ planar GRI-Ls for hyperbolic (H1) refractive index profiles. The dashed curve is for pHEMA-TiO$_2$; and the solid curve is for B—SiO$_2$.
FIG. 6(b) shows a plot of aberrations (in 10$^{-3}$ m) versus dioptric power (in m$^{-1}$), showing simulated spherical aberrations from a planar B—SiO$_2$ GRI-L with a quadratic GRI-L profile (S1) (g=1700.68 m$^{-2}$) as a function of lens power (dioptric power range of 18 m$^{-1}$-30 m$^{-1}$). The data points with the higher aberration values are for longitudinal; and the data points with the lower aberration values are for transverse.
FIG. 6(c) shows a plot of refractive index versus radius (in millimeters (mm)), showing the refractive index profile for p(HEMA)-TiO$_2$ and B—SiO$_2$ lenses based on the hyperbolic refractive index expression in the table in FIG. 8. GRI-L parameters are indicated, and the incident peripheral ray span is 0.032 m. Of the three curves for p(HEMA)-TiO$_2$, the curve with the highest refractive index values is for g=20 m$^{-1}$, the curve with the second-highest refractive index values is for g=31 m$^{-1}$, and the curve with the lowest refractive index values is for g=41 m$^{-1}$. Of the three curves for B—SiO$_2$, the curve with the highest refractive index values is for g=20 m$^{-1}$, the curve with the second-highest refractive index values is for g=31 m$^{-1}$, and the curve with the lowest refractive index values is for g=41 m$^{-1}$.
FIG. 6(d) shows a bar chart of spherical aberration (in 10$^{-4}$ m) for GRI-L profiles, showing spherical aberration for B—SiO$_2$ lenses for varying heights and GRI-L parameters based on the hyperbolic refractive index expression in the table in FIG. 8. In each of the three sections separated by the dashed vertical lines, the leftmost bar is for H=2.0 cm, the middle bar is for H=2.5 cm, and the rightmost bar is for H=3.0 cm.

FIG. 6(a) shows the dioptric power as a function of lens thickness for a B—SiO₂—TiO₂ and pHEMA-TiO₂ system based on a hyperbolic (H1) GRI-L profile. The lens power increases and plateaus at a thickness of about 0.038 meters (m), after which it decreases. The slight change in both power profiles implies that the material composition of the GRI-L lenses will affect the power of lenses for specific thicknesses. Lens thicknesses for applications requiring specific dioptric power may thus be estimated. Based on this thickness-power relation, the spherical longitudinal and transverse aberrations can be readily determined (see FIG. 6(b)) for different lens thicknesses. FIG. 6(b) shows the variation of the longitudinal and transverse spherical aberrations with increasing dioptric power of lenses for a quadratic (S1) GRI-L profile (g=41 per meter (m⁻¹)). The observed approximately increasing linear relationship correlates with trends for GRI-Ls such as natural and crystalline. For further specific optical studies, a lens with a peripheral ray span of 3.2 cm (interspace between the farthest incident peripheral ray and the optical axis was fixed at 0.016 m) was considered and utilized for obtaining the spherical aberration values based on a hyperbolic index distribution (H1). In FIG. 6(c), the refractive index profile for the planar B—SiO₂ GRI-L based on a hyperbolic refractive index expression in the table in FIG. 8 is shown for a 4 mm radius with different GRI-L parameters. Higher GRI-L parameter values result in steeper profiles for both systems. FIG. 6(d) shows the spherical aberrations for B—SiO₂ based lenses for varying lens thicknesses (2 cm to 3 cm) and GRI-L parameters for a hyperbolic refractive index profile. Within the ranges considered, aberrations became more positive both with increasing GRI-L parameter values and increasing lens thicknesses. Based on these results, zero aberration lenses can easily be extrapolated while keeping either of these two variables constant.

Example 2

A key factor in using the SLA techniques of embodiments of the subject invention to obtain high quality lenses is to establish the miscibility and behavior of the resin sludge. In order to verify the miscibility of the resin and print process, the vat (see FIG. 1) was placed under an ultraviolet (UV)

lamp of wavelength 365 nm. A HEMA-TiO$_2$ sludge system was used as a test case. The resin vat was first filled with a HEMA based photocurable sludge with a 4% TiO$_2$ content, after which an undoped auxiliary resin was introduced gradually into the vat while curing. The ratio of the primary and auxiliary resin systems was kept at 1:3 by volume at the end of the curing process. The vat was protected by an adjustable system of overlapping black plates, which allowed for controlling the diameter of a central hole for light passage.

Figures 7A, 7B, 7C, 7D, 7E, 7F:
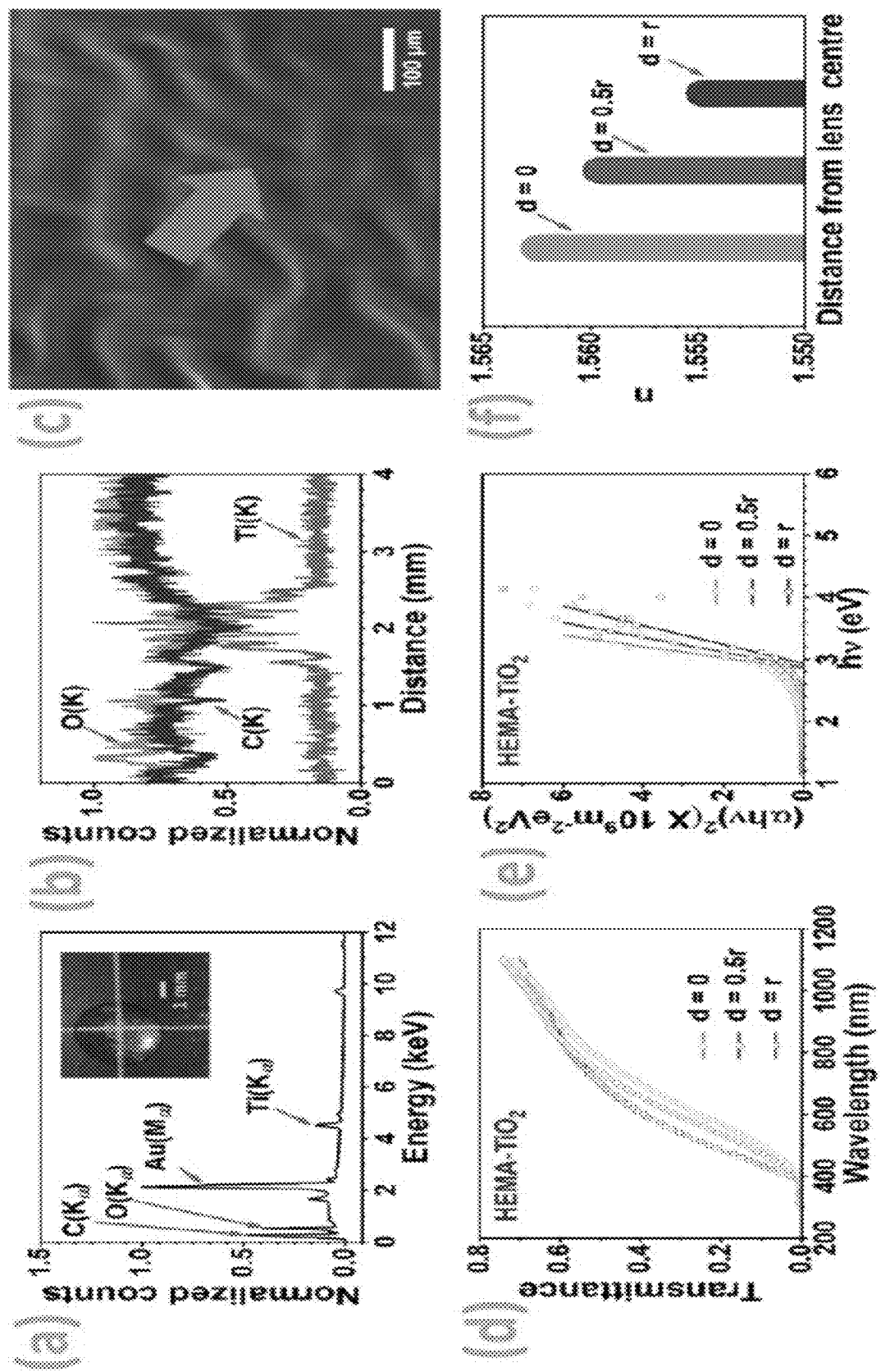
FIG. 7(a) shows a plot of normalized counts versus energy (in kilo-electron Volts (keV)), showing energy dispersive X-ray fluorescence spectroscopy (EDX) of a TiO$_2$-pHEMA GRI-L. The scale bar for the inset image is 1 mm.
FIG. 7(b) shows a plot of normalized counts versus distance across diameter (in mm), showing a linear distribution of characteristic EDX peaks for a TiO$_2$-pHEMA GRI-L across its diameter.
FIG. 7(c) shows a scanning electron microscope (SEM) image of a TiO$_2$-pHEMA GRI-L (arrow points radially outwards).
FIG. 7(d) shows a plot of transmittance versus wavelength (in nanometers (nm)), showing the luminous transmittance of a TiO$_2$-pHEMA GRI-L at indicated spots on the lens. The curve of datapoints with the highest transmittance value at 600 nm is for d=r; the curve of datapoints with the second-highest transmittance value at 600 nm is for d=0.5r; and the curve of datapoints with the lowest transmittance value at 600 nm is for d=0.
FIG. 7(e) shows a plot of αhν (in 10$^9$ square electron Volts per square meter (10$^9$ eV$^2$/m$^2$)) versus kν (in electron Volts (eV)), showing optical band gap extraction from fitting to the Tauc model for a TiO$_2$-pHEMA GRI-L at indicated spots on the lens. The curve of datapoints with the highest αhν value at 3 eV is for d=0; the curve of datapoints with the second-highest αhν value at 3 eV is for d=0.5r; and the curve of datapoints with the lowest αhν value at 3 e is for d=r.
FIG. 7(f) shows a bar chart of refractive index (n) at different distances from lens center, showing position dependent refractive index of a TiO$_2$-pHEMA GRI-L.

FIG. 7(a) shows the EDS spectrum of the pHEMA structure modified by TiO$_2$ at an arbitrary position on the lens. The titanium ($K_\alpha$: 4.508 kilo-electron Volts (keV)), carbon ($K_\alpha$: 0.277 keV) and oxygen ($K_\alpha$: 0.5249 keV) energy peaks are evident. The peak at 2.12 keV is characteristic for gold, which was used in coating the lenses to enhance conductivity. The inset in FIG. 7(a) shows a lens with the GRI-L profile shown in FIG. 7(a). FIG. 7(b) shows the elemental concentration profile across the lens diameter. The expected increase in the intensity of the titanium characteristic peak and corresponding decrease in the carbon and oxygen peak profile establishes the miscibility and effectiveness of the technique. The SEM image is shown in FIG. 7(c). The observed zigzag structure of locally quasi-ordered domains indicate the gelled TiO$_2$ network embedded with the HEMA matrix. The arrow indicates an outwardness towards the circumference of the lens, and it is evident that there is a lower density of TiO$_2$ radially outwards.

FIG. 7(d) shows the optical transmittance as a function of wavelength at three spots on the lens (center (0), semi radius (r/2) and at the circumference (r)). The optical transparency slightly increases radially outwards as is observed from FIG. 7(d). This is ascribed to be a result of the nature of the size of the TiO$_2$. TiO$_2$ nanoparticles are reported to have minimal effect on optical transparency whereas as particle size increases, this decreases. It is presumed that a reduced gelation time (aging time) could result in a TiO$_2$-HEMA lens system of higher transparency although this could result in a trade-off for other properties. The decrease in the transparency, though, does not significantly affect the overall transparency or quality of the lens. The cut-off wavelength was also found to decrease progressively radially outwards from 400 nm to 370 nm. This cut-off wavelength corresponds to the wavelength below which a material absorbs all incident radiation, and this depends strongly on dopant nature and concentration.

The quality of GRI-Ls can be characterized by correctly measuring the GRI-L profiles either via destructive or non-destructive techniques. The techniques of embodiments of the subject invention are simple and basic while allowing for a non-destructive and precise characterization as the easily measurable composition of the dopants is a direct reflection of the GRI-L profile. FIG. 7(e) shows a plot that enables an estimation of the refractive index at different locations on the lens based on the Tauc model, which is a model that is utilized in estimating optical properties of transparent materials such as band gap, Urbach energy, refractive indices, etc. from transmittance and absorptance data (see also, e.g.; Tauc, States in the gap, J. Non. Cryst. Solids. 8-10, 569-585, 1972, doi.org/10.1016/0022-3093(72)90194-9; and Saeed et al., Optical Spectroscopic Analysis of High Density Lead Borosilicate Glasses, Silicon, 2018, doi.org/10.1007/s12633-015-9391-7; both of which are hereby incorporated by reference herein in their entireties). Here, the optical band gap $E_g$ is determined by considering a linear extrapolation to the zero ordinate of a plot of $(ahv^{1/2})$ against the incident photon energy (hv) (see also, e.g., Limkitjaroenporn et al., Physical, optical, structural and gamma-ray shielding properties of lead sodium borate glasses, J. Phys. Chem. Solids, 2011, doi.org/10.1016/j.jpcs.2011.01.007; which is hereby incorporated by reference herein in its entirety). The Tauc plot relation for optical band gap is given by Equation (6):

$$\frac{hv_a}{n} = A(hv - E_g) \quad (6)$$

where h is the Planck's constant, v is the vibration frequency, α is the absorption coefficient, $E_g$ is the band gap energy, A is a constant of proportionality and n is ½, 3/2, 2, or 3 for a direct, forbidden direct, indirect, or forbidden indirect transition, respectively.

The refractive index (n) obtained from the optical band gap was determined according to Equation. (7) based on the Lorenz theory:

$$\frac{n^2 - 1}{n^2 + 2} = 1 - \sqrt{\left(\frac{E_g}{20}\right)} \quad (7)$$

where n is the refractive index and $E_g$ is the optical band gap. The refractive index values obtained at the three positions on the lens are shown in FIG. 7(f). There is a decrease in value outwards.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of fabricating a gradient refractive index lens (GRI-L), the method comprising:
    preparing a sol gel precursor comprising a first material;
    preparing a resin sludge comprising a second material and a polymer material, the second material being different from the first material, and a refractive index of the first material being different from a refractive index of the second material;
    performing a three-dimensional (3D) printing process in a vat platform using the resin sludge to give a green body;
    performing a calcination process on the green body at a first temperature high enough to eliminate the polymer material, to give a calcinated body;
    flooding the sol gel precursor into the vat platform with the calcinated body to give an intermediate lens body, the flooding of the sol gel being performed in such a manner so as to allow for control of concentration of the sol gel precursor along a vertical axis of the intermediate lens body and a horizontal axis of the intermediate lens body;
    performing a densification step on the intermediate lens body at a second temperature to give the GRI-L.

2. The method according to claim 1, the GRI-L being planar.

3. The method according to claim 1, a thickness of the GRI-L being constant from a center of the GRI-L to an outermost edge of the GRI-L.

4. The method according to claim 1, the first material being a ceramic material, and the second temperature being below a softening temperature of silica.

5. The method according to claim 4, the second material being a ceramic material, and the first temperature being below the softening temperature of silica.

6. The method according to claim 1, the first material being $SiO_2$ or $TiO_2$, and the second temperature being below a softening temperature of silica.

7. The method according to claim 1, the first material being $SiO_2$ and the second material being $TiO_2$,
the second temperature being below a softening temperature of silica, and
the first temperature being below the softening temperature of silica.

8. The method according to claim 1, further comprising adding a dopant after performing the calcination process.

9. The method according to claim 8, the dopant being titanium.

10. The method according to claim 1, further comprising thickening the resin sludge with fumed silica nanoparticles before performing the 3D printing process using the resin sludge.

11. A method of fabricating a gradient refractive index lens (GRI-L), the method comprising:
preparing a sol gel precursor comprising a first material;
preparing a resin sludge comprising a second material and a polymer material, the second material being different from the first material, and a refractive index of the first material being different from a refractive index of the second material;
performing a three-dimensional (3D) printing process in a vat platform using the resin sludge to give a green body;
adding a dopant to the green body to give a doped green body;
performing a calcination process on the doped green body at a first temperature high enough to eliminate the polymer material, to give a calcinated body;
flooding the sol gel precursor into the vat platform with the calcinated body to give an intermediate lens body, the flooding of the sol gel being performed in such a manner so as to allow for control of concentration of the sol gel precursor along a vertical axis of the intermediate lens body and a horizontal axis of the intermediate lens body;
performing a densification step on the intermediate lens body at a second temperature to give the GRI-L.

12. The method according to claim 11, the dopant being titanium.

13. The method according to claim 11, the GRI-L being planar.

14. The method according to claim 11, a thickness of the GRI-L being constant from a center of the GRI-L to an outermost edge of the GRI-L.

15. The method according to claim 11, the first material being a ceramic material, and the second temperature being below a softening temperature of silica.

16. The method according to claim 15, the second material being a ceramic material, and the first temperature being below the softening temperature of silica.

17. The method according to claim 11, the first material being $SiO_2$ or $TiO_2$, and the second temperature being below a softening temperature of silica.

18. The method according to claim 11, the first material being $SiO_2$ and the second material being $TiO_2$,
the second temperature being below a softening temperature of silica, and
the first temperature being below the softening temperature of silica.

19. The method according to claim 11, further comprising thickening the resin sludge with fumed silica nanoparticles before performing the 3D printing process using the resin sludge.

20. A method of fabricating a gradient refractive index lens (GRI-L), the method comprising:
preparing a sol gel precursor comprising a first material;
preparing a resin sludge comprising a second material and a polymer material, the second material being different from the first material, and a refractive index of the first material being different from a refractive index of the second material;
thickening the resin sludge with fumed silica nanoparticles;
performing a three-dimensional (3D) printing process in a vat platform using the thickened resin sludge to give a green body;
performing a calcination process on the green body at a first temperature high enough to eliminate the polymer material, to give a calcinated body;
flooding the sol gel precursor into the vat platform with the calcinated body to give an intermediate lens body, the flooding of the sol gel being performed in such a manner so as to allow for control of concentration of the sol gel precursor along a vertical axis of the intermediate lens body and a horizontal axis of the intermediate lens body;
performing a densification step on the intermediate lens body at a second temperature to give the GRI-L,
the GRI-L being planar,
a thickness of the GRI-L being constant from the center of the GRI-L to the edge of the GRI-L,
the first material being a ceramic material,
the second temperature being below a softening temperature of silica,
the second material being a ceramic material,
the first temperature being below the softening temperature of silica,
the method further comprising adding a dopant either before or after performing the calcination process, and
the thickness of the GRI-L being in a range of from 1 millimeter (mm) to 12 centimeters (cm).

\* \* \* \* \*